A vehicle lamp control apparatus includes a receiver, a storage, a correction section, and an adjustment instruction section. The receiver receives output values of an acceleration sensor. The storage stores information indicating an ideal positional relationship between sensor-side axes and vehicle-side axes. The correction section plots the output values, obtained during running of a vehicle, on coordinates in which acceleration in a vehicle longitudinal direction is set to a first axis and acceleration in a vehicle lateral/vertical direction is set to a second axis, derives a straight line from plotted points, calculates displacements of the sensor-side and vehicle-side axes from the ideal positional relationship, using an inclination of the straight line, and corrects the information. The adjustment instruction section derives a tilt angle of the vehicle from current acceleration using the corrected information, and generates a control signal to instruct adjustment of an optical axis of a vehicle lamp.

United States Patent
Saeki et al.

(10) Patent No.: US 9,931,975 B2
(45) Date of Patent: Apr. 3, 2018

(54) VEHICLE LAMP CONTROL APPARATUS

(71) Applicant: KOITO MANUFACTURING CO., LTD., Tokyo (JP)

(72) Inventors: Yukinori Saeki, Shizuoka (JP); Masashi Yamazaki, Shizuoka (JP); Yusuke Kasaba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 384 days.

(21) Appl. No.: 14/553,776

(22) Filed: Nov. 25, 2014

(65) Prior Publication Data
US 2015/0146441 A1 May 28, 2015

(30) Foreign Application Priority Data

Nov. 25, 2013 (JP) ................. 2013-242563
Nov. 13, 2014 (JP) ................. 2014-230406

(51) Int. Cl.
B60Q 1/115 (2006.01)

(52) U.S. Cl.
CPC ........ B60Q 1/115 (2013.01); B60Q 2300/112 (2013.01); B60Q 2300/114 (2013.01);
(Continued)

(58) Field of Classification Search
CPC .............. B60Q 1/115; B60Q 2300/122; B60Q 2300/112; B60Q 2300/132; B60Q 2300/114; B60Q 2300/324
See application file for complete search history.

(56) References Cited

U.S. PATENT DOCUMENTS

2011/0317439 A1  12/2011  Yamazaki et al.
2012/0002430 A1   1/2012  Yamazaki et al.
(Continued)

FOREIGN PATENT DOCUMENTS

CN    102537854 A    7/2012
CN    102806868 A   12/2012
(Continued)

OTHER PUBLICATIONS

Office Action issued in corresponding Chinese Application No. 201410670325.0, dated May 3, 2016 (15 pages).
(Continued)

Primary Examiner — Sharon Payne
(74) Attorney, Agent, or Firm — Osha Liang LLP

(57) ABSTRACT

7 Claims, 6 Drawing Sheets

(52) U.S. Cl.
CPC .. *B60Q 2300/122* (2013.01); *B60Q 2300/132* (2013.01); *B60Q 2300/324* (2013.01)

(56) References Cited

U.S. PATENT DOCUMENTS

| | | |
|---|---|---|
| 2012/0101692 A1 | 4/2012 | Kasaba et al. |
| 2012/0155098 A1 | 6/2012 | Kasaba et al. |
| 2012/0310486 A1 | 12/2012 | Kasaba et al. |

FOREIGN PATENT DOCUMENTS

| | | |
|---|---|---|
| JP | 2012-030782 A | 2/2012 |
| JP | 2012-030783 A | 2/2012 |
| JP | 2013001156 A | 1/2013 |

OTHER PUBLICATIONS

Office Action issued in corresponding Chinese Application No. 201410670325.0 dated Dec. 30, 2016 (14 pages).

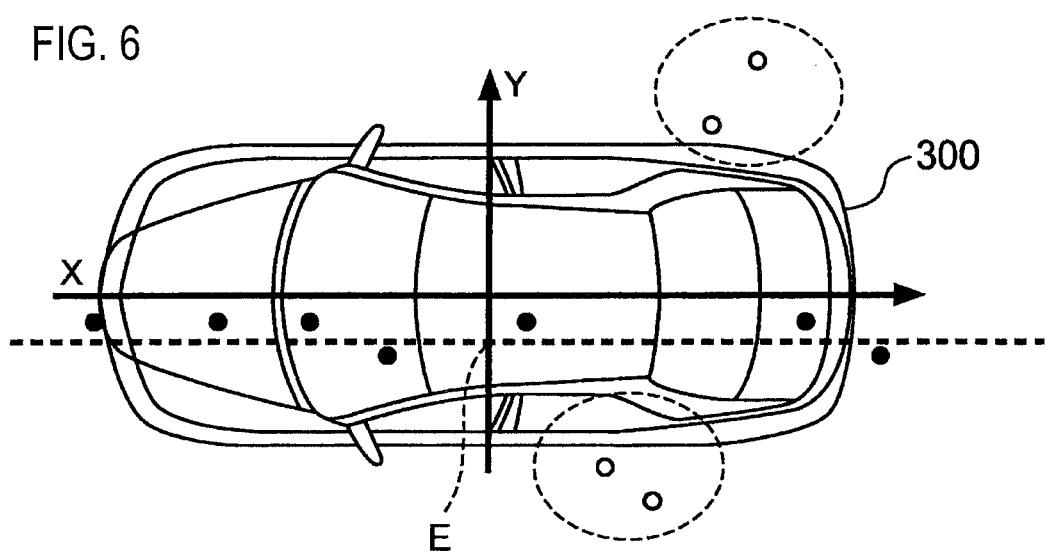

VEHICLE LAMP CONTROL APPARATUS

CROSS REFERENCE TO RELATED APPLICATION(S)

This application is based on and claims priority under 35 U.S.C. § 119 to Japanese Patent Application Nos. 2013-242563 (filed on Nov. 25, 2013) and 2014-230406 filed on Nov. 13, 2014, the entire contents of which are incorporated herein by reference.

BACKGROUND

Field

Embodiments of the invention relate to a vehicle lamp control apparatus, and particularly to a vehicle lamp control apparatus for use in an automobile or the like.

Related Art

There has been known an auto-leveling control in which a position of an optical axis of a vehicle headlamp is adjusted automatically in accordance with a tilt angle of a vehicle so as to change an illumination direction of the headlamp. In the auto-leveling control, the position of the optical axis of the headlamp may be adjusted based on a pitch angle of the vehicle which is derived from an output value of a vehicle height sensor. On the other hand, JP 2012-030782 A (corresponding to US 2012/0002430 A1) and JP 2012-030783 A (corresponding to US 2011/0317439 A1) describe a vehicle lamp control apparatus in which auto-leveling control is carried out using a tilt sensor such as an acceleration sensor.

SUMMARY

When an acceleration sensor is used as a device for detecting a tilt of a vehicle, an auto-leveling system can be provided at a lower price and with lighter weight than the case where a vehicle height sensor is used. As a result, the vehicle can be made lower in cost and lighter in weight. On the other hand, even if the acceleration sensor is used, there is a demand to perform the auto-leveling control with a high accuracy.

As a result of intensive studies for achieving a higher accuracy in auto-leveling control, the inventors found that there is still a room for further improvement in accuracy of the auto-leveling control in a vehicle lamp control apparatus of the related art.

One embodiment of the invention has been made in view of the above circumstances and provides a technique for enhancing an accuracy of an auto-leveling control for a vehicle lamp.

(1) According to one exemplary embodiment, a vehicle lamp control apparatus includes a receiver, a position information storage, a correction section, and an adjustment instruction section. The receiver is configured to receive output values of an acceleration sensor. The position information storage is configured to store information indicating an ideal positional relationship between (i) sensor-side axes in a state where the acceleration sensor is mounted on a vehicle and (ii) vehicle-side axes defining a posture of the vehicle. The correction section is configured to plot the output values, which are obtained during running of the vehicle, on coordinates in which acceleration in a vehicle longitudinal direction is set to a first axis and acceleration in a vehicle lateral direction or a vehicle vertical direction is set to a second axis, derive a straight line or a vector from plural plotted points on the coordinates, calculate displacements of the sensor-side axes and the vehicle-side axes from the ideal positional relationship, using an inclination of the straight line or the vector, and correct the information. The adjustment instruction section is configured to derive a tilt angle of the vehicle from current acceleration using the corrected information, and generate a control signal to instruct adjustment of an optical axis of the vehicle lamp.

With this configuration, an accuracy of the auto-leveling control for a vehicle lamp can be enhanced.

(2) According to another exemplary embodiment, a vehicle lamp control apparatus includes a receiver, a position information storage, a correction section and an adjustment instruction section. The receiver is configured to receive output values of an acceleration sensor. The position information storage is configured to store information indicating an ideal positional relationship between (i) sensor-side axes in a state where the acceleration sensor is mounted on a vehicle and (ii) vehicle-side axes defining a posture of the vehicle. The correction section is configured to plot the output values, which are obtained during running of the vehicle, on coordinates in which acceleration in a vehicle longitudinal direction is set to a first axis and acceleration in a vehicle lateral direction or a vehicle vertical direction is set to a second axis, derive a straight line or a vector from plural plotted points on the coordinates, calculate displacements of the sensor-side axes and the vehicle-side axes from the ideal positional relationship, using an inclination of the straight line or the vector, and correct the information. The adjustment instruction section is configured to derive a tilt angle of the vehicle from current acceleration using the information, correct the derived tilt angle using the corrected information, and generate a control signal to instruct adjustment of an optical axis of a vehicle lamp, using the corrected tilt angle.

With this configuration, an accuracy of the auto-leveling control for a vehicle lamp can be enhanced.

(3) In the vehicle lamp control apparatus of any one of (1) and (2), the sensor-side axes may include an X axis, a Y axis and a Z axis which are mutually orthogonal to each other. The correction section may be configured to correct a positional relationship between the X axis and the vehicle longitudinal axis based on the inclination.

(4) In the vehicle lamp control apparatus of any one of (1) to (3), the correction section may be configured, if the inclination exceeds a predetermined threshold value, to correct the information so as to decrease the inclination by a correction value which is smaller than the predetermined threshold value.

With these configurations, the accuracy of the auto-leveling control for the vehicle lamp can be enhanced.

(5) In the vehicle lamp control apparatus of any one of (1) to (4), if output values which are obtained when the vehicle is in a specific running state including at least one of a predetermined curve running state and a predetermined ramp running state are included in the output values to be used for deriving the straight line or the vector, the correction section may exclude the obtained output values and then derives the straight line or the vector.

(6) In the vehicle lamp control apparatus of (5), the correction section may be configured to derive a reference value for determining the specific running state from accelerations, in the vehicle lateral direction, of the plural output values. If a difference between the acceleration, in the vehicle lateral direction, of each output value of the acceleration sensor and the reference value exceeds a predetermined threshold value, the correction section may exclude the output value and derives the straight line or the vector.

(7) In the vehicle lamp control apparatus of any one of (1) to (6), the correction section may be configured to plot the output values, which are obtained during running of the vehicle, on the coordinates in which the acceleration in the vehicle longitudinal direction is set to the first axis and the acceleration in the vehicle lateral direction is set to the second axis, derive the straight line or the vector from the plural plotted points, calculate a variance of the plotted output values with respect to the derived straight line or the vector, and derive a straight line or a vector again when the obtained variance exceeds a predetermined threshold value.

With these configurations, the accuracy of the auto-leveling control for the vehicle lamp can be further enhanced. Suitable combinations of some of the above described components are also included in the scope of the invention which this application for patent seeks to protect.

According to the above configurations, it is possible to provide a technique for enhancing an accuracy of an auto-leveling control for a vehicle lamp.

BRIEF DESCRIPTION OF THE DRAWINGS

FIG. 6 is a view for explaining output values, of the acceleration sensor, which are obtained when the vehicle is in a specific running state.

DETAILED DESCRIPTION

Figure 1:
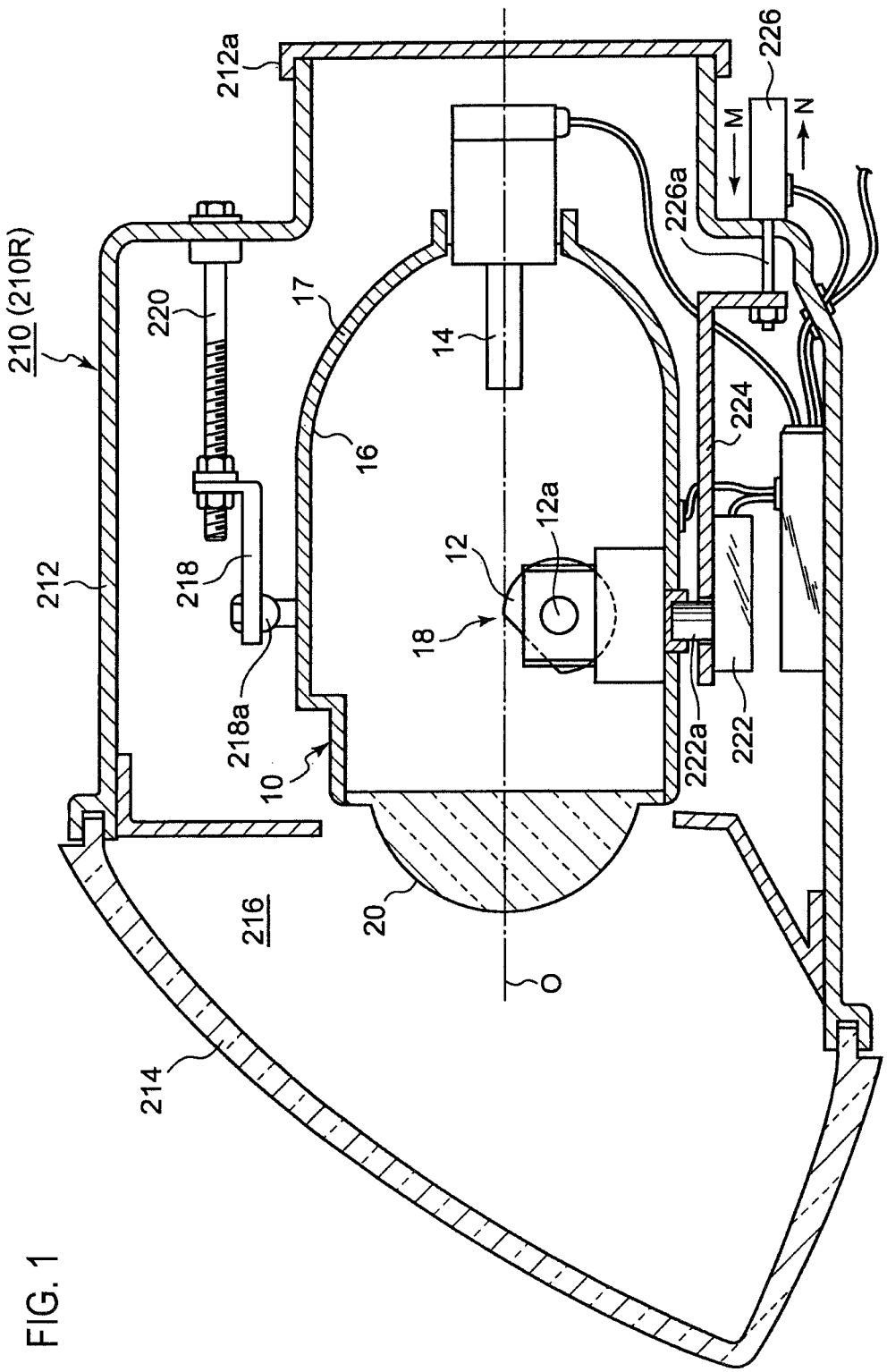
FIG. 1 is a schematic vertical section view of a headlamp unit including a vehicle lamp to be controlled by a leveling ECU according to an embodiment.

Exemplary embodiments will be described below with reference to the accompanying drawings. Constituent elements, members and/or steps which are shown in the drawings and which are the same as or equivalent to each other may be given the same reference signs. Also, redundant description thereon may be omitted accordingly. It should be noted that the exemplary embodiments described below do not limit the scope of the invention, but are illustrative. All of features described below or any combination thereof may not be always essential for the invention.

In this specification, expressions "during running of a vehicle" and "when a vehicle is running" mean, for example, a state in which a vehicle is during a period from a time when a detection value of a vehicle speed sensor 312 (which will be described later) exceeds 0 to a time when the detection value of the vehicle speed sensor 312 reaches 0. An expression "when a vehicle is stopping" means, for example, a state in which a vehicle is at a time when a detection value of an acceleration sensor 110 (which will be described later) becomes stable after the detection value of the vehicle speed sensor 312 reaches 0. An expression "when a vehicle is static" means, for example, a state in which a vehicle is during a period from a time when the detection value of the acceleration sensor 110 becomes stable to a time when the detection value of the vehicle speed sensor 312 exceeds 0. This expression "the time when the detection value of the acceleration sensor 110 becomes stable" may be regarded as a time when a change amount of an output value of the acceleration sensor 110 per unit time becomes equal to or less than a predetermined amount or may be regarded as a time when a predetermined time (for example, one or two seconds) has elapsed since the detection value of the vehicle sensor 312 reached 0. It is also noted that a state in which "a vehicle stops" includes both of (i) a state in which "the vehicle is static" and (ii) a state in which "the vehicle is stopping."

FIG. 1 is a schematic vertical section view of a headlamp unit including a vehicle lamp to be controlled by a leveling ECU according to one embodiment. A headlamp unit 210 includes a pair of headlamp units 210R, 210L which are formed horizontally symmetrically. The headlamps 210R, 210L are respectively disposed in right and left sides, in a vehicle width direction, of a vehicle. The right headlamp unit 210R and the left headlamp unit 210L have substantially the same configuration. Therefore, the structure of the right headlamp unit 21 OR will be described below. The headlamp unit 21OR has a lamp body 212 and a transparent cover 214. The lamp body 212 is formed with an opening portion on a vehicle front side. The transparent cover 214 covers the opening portion of the lamp body 212. The lamp body 212 has a detachable cover 212a on a vehicle rear side. A lamp chamber 216 is defined by the lamp body 212 and the transparent cover 214. The lamp chamber 216 houses a lamp unit 10 which serves as a vehicle lamp.

A lamp bracket 218 having a pivot mechanism 218a is connected to the lamp unit 10. The lamp unit 10 can vertically and horizontally swing about the pivot mechanism 218a. The lamp bracket 218 is screwed with an aiming adjustment screw 220 supported on the lamp body 212. A rotary shaft 222a of a swivel actuator 222 is fixed to a lower surface of the lamp unit 10. The swivel actuator 222 is fixed to a unit bracket 224. A leveling actuator 226 is connected to the unit bracket 224. The leveling actuator 226 includes, for example, a motor or the like that expands and contracts a rod 226a in directions indicated by arrows M, N. When the rod 226a is expanded or contracted in the directions indicated by the arrows M, N, the lamp unit 10 has a backward tilting posture or a forward tilting posture. Thereby, a leveling adjustment which directs a pitch angle of an optical axis O downward or upward can be performed.

The lamp unit 10 includes a shade mechanism 18, a light source 14, a lamp tool housing 17, and a projection lens 20. The shade mechanism 18 includes a rotary shade 12. The lamp tool housing 17 supports a reflector 16 on its inner wall. Examples of the light source 14 include an incandescent bulb, a halogen lamp, a discharge lamp, an LED and the like. At least a portion of the reflector 16 has an elliptic sphere shape. The reflector 16 reflects light emitted from the light source 14. A part of the light emitted from the light source 14 and a part of the light reflected by the reflector 16 are guided to the projection lens 20 through the rotary shade 12. The rotary shade 12 is a cylindrical member that is rotatable about a rotation shaft 12a. The rotary shade 12 is formed with a notch portion and includes a plurality of shade plates (not shown). The notch portion or one of the shade plates is moved so as to be located on the optical axis O, and thereby a predetermined light distribution pattern is formed. The projection lens 20 includes a plano-convex aspherical lens. A light source image formed on a rear focal plane is projected as an inverted image onto a virtual vertical screen ahead of the lamp.

Figure 2:
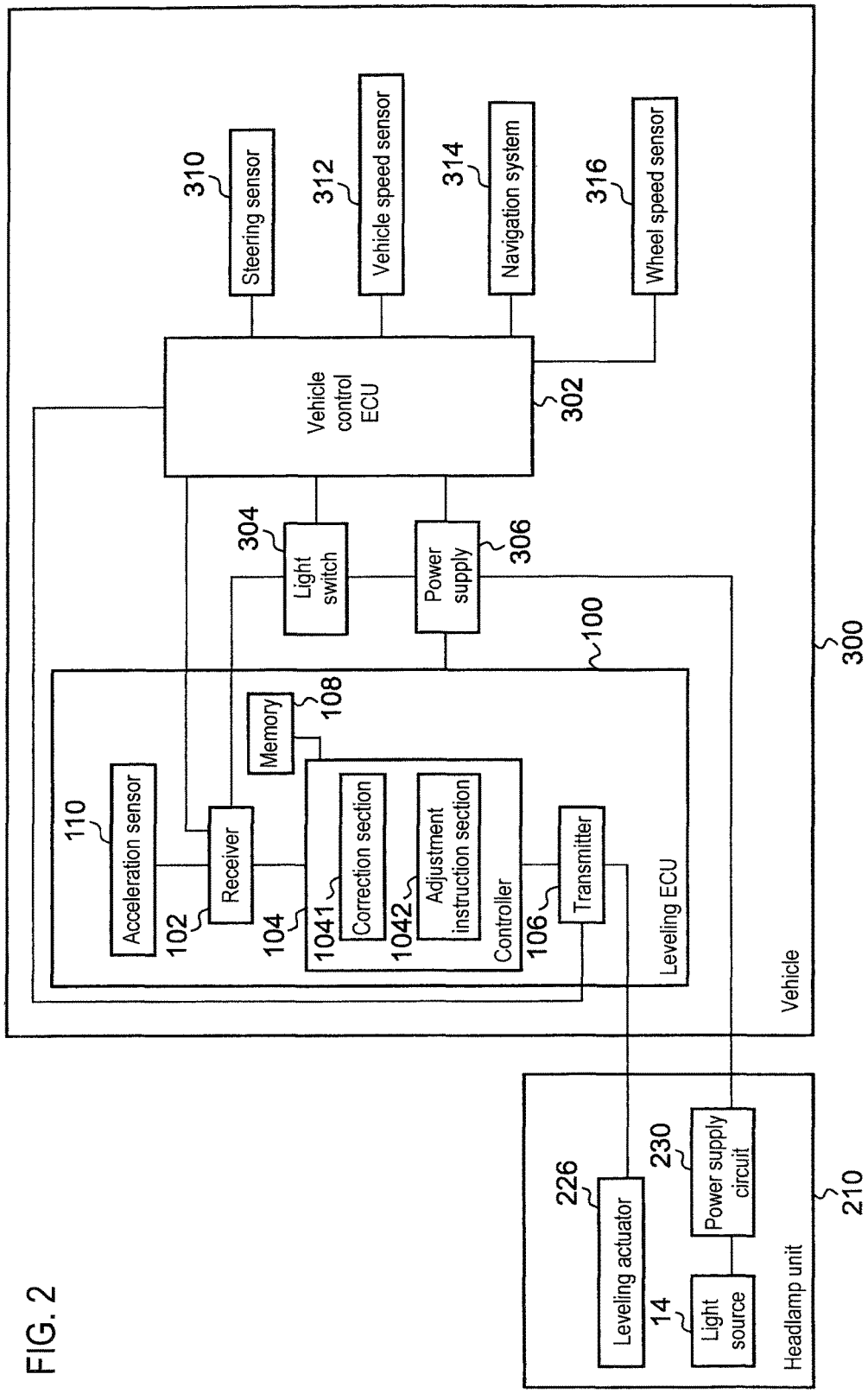
FIG. 2 is a functional block diagram for explaining cooperation among the headlamp unit, the leveling ECU and a vehicle control ECU.

FIG. 2 is a functional block diagram for explaining cooperation among the headlamp unit, a leveling ECU and a vehicle control ECU. In FIG. 2, the headlamp unit 210R and the headlamp unit 210L are collectively referred to as the "headlamp unit 210." Also, a leveling ECU 100 and a vehicle control ECU 302 may be implemented by a hardware configuration and/or a software configuration. The hardware configuration may include elements and circuits such as a CPU and a memory of a computer. The software configuration may include computer programs. FIG. 2 shows the leveling ECU 100 and the vehicle control ECU 302 as functional blocks which are implemented by cooperation of the hardware illustrated and the software configuration. One skilled in the art would appreciate that such functional blocks may be implemented in various manners using combinations of hardware and software.

The leveling ECU 100 is an example of a vehicle lamp control apparatus. The leveling ECU 100 includes a receiver 102, a controller 104, a transmitter 106, a memory 108 and an acceleration sensor 110. The controller 104 includes a correction section 1041 and an adjustment instruction section 1042. The leveling ECU 100 is, for example, installed near a dashboard of a vehicle 300. It should be noted that the installation position of the leveling ECU 100 is not limited thereto. The leveling ECU 100 may be disposed, for example, inside the headlamp unit 210 or the vehicle control ECU 302. Also, the acceleration sensor 110 may be provided outside the leveling ECU 100. The vehicle control ECU 302 and a light switch 304 which are mounted on the vehicle 300 are connected to the leveling ECU 100. Signals output from the vehicle control ECU 302 and the light switch 304 are received by the receiver 102. The receiver 102 also receives an output value of the acceleration sensor 110.

A steering sensor 310, a vehicle speed sensor 312, a navigation system 314, a wheel speed sensor 316 and the like are connected to the vehicle control ECU 302. The vehicle control ECU 302 may acquire various information from the steering sensor 310, the vehicle speed sensor 312, the navigation system 314, the wheel speed sensor 316 and the like, and transmit the acquired information to the leveling ECU 100. Thereby, the leveling ECU 100 can detect a running state of the vehicle 300.

The light switch 304 transmits an instruction signal to turn on/off the headlamp unit 210, an instruction signal indicating a light distribution pattern to be formed by the headlamp unit 210, an instruction signal to execute the auto-leveling control or the like to a power supply 306, the vehicle control ECU 302, the leveling ECU 100, and/or the like, in accordance with driver's operation. For example, the light switch 304 transmits to the leveling ECU 100 an instruction signal to execute the auto-leveling control. In response, the leveling ECU 100 starts the auto-leveling control. The power supply 306 is a power supply for supplying electric power to the leveling ECU 100, the vehicle control ECU 302 and the headlamp unit 210. For example, when turning on of the headlamp unit 210 is instructed in accordance with an operation of the light switch 304, electric power is supplied from the power supply 306 to the light source 14 through a power supply circuit 230.

The memory 108 can store a reference value of a road surface angle θr (which will be described later), a reference value of a vehicle posture angle θv (which will be described later), and output values from various sensors such as the acceleration sensor 110, the steering sensor 310, the vehicle speed sensor 312, the wheel speed sensor 316, and the like. Output values of the acceleration sensor 110 are stored into the memory 108 repeatedly at predetermined time intervals. The memory 108 is an example of a position information storage. The memory 108 stores information indicating a positional relationship between sensor-side axes in a state where the acceleration sensor 110 is mounted on the vehicle 300 and vehicle-side axes which define the posture of the vehicle 300. Hereinafter, the positional relationship may be referred to as "positional relationship information," the sensor-side axes as "sensor axes," and the vehicle-side axes as "vehicle axes."

The receiver 102 transmits the received signals to the controller 104. The controller 104 (specifically, the adjustment instruction section 1042) derives a tilt angle of the vehicle 300 based on (i) the output values of the acceleration sensor 110 transmitted from the receiver 102 and (ii) if necessary, the information stored in the memory 108. The controller 104 (adjustment instruction section 1042) generates a control signal to instruct an adjustment of the optical axis of the lamp unit 10 and outputs the generated control signal to the transmitter 106. The transmitter 106 outputs the received control signal to the leveling actuator 226. The leveling actuator 226 is driven based on the received control signal so as to adjust the optical axis O of the lamp unit 10 in the vehicle vertical direction (pitch angle direction).

Also, the controller 104 (specifically, the correction section 1041) performs a correction process. In the correction process, the controller 104 (correction section 1041) corrects the positional relationship information stored in the memory 108 using the output values of the acceleration sensor 110 which are detected during running of the vehicle 300. The correction process will be described in detail later.

Figure 3:
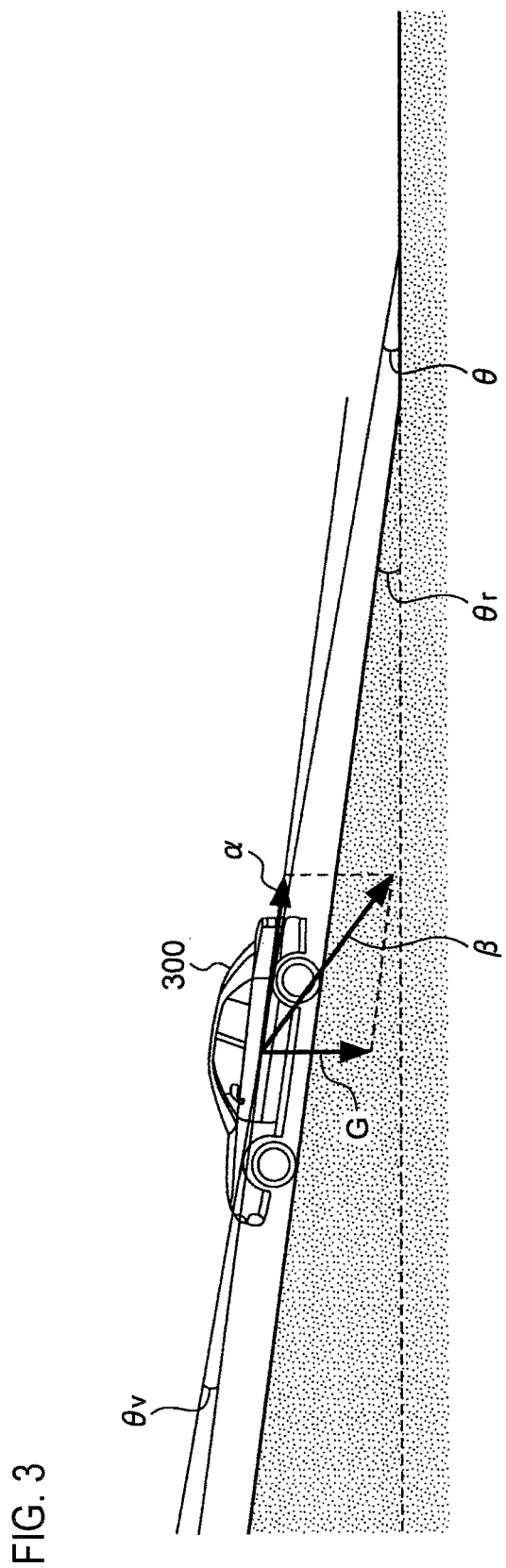
FIG. 3 is a schematic view for explaining (i) acceleration vectors generated in a vehicle and (ii) a tilt angle of the vehicle which can be detected by an acceleration sensor.

Next, the auto-leveling control executed by the leveling ECU 100 having the aforementioned configuration will be described. FIG. 3 is a schematic view for explaining (i) acceleration vectors generated in the vehicle 300 and (ii) the tilt angle of the vehicle 300 which can be detected by the acceleration sensor 110.

For example, when a luggage is loaded on a rear portion of the vehicle or when a passenger is on a rear seat, the vehicle has a backward tilting posture. When the luggage is unloaded or when the passenger on the rear seat gets off, the vehicle in the backward tilting posture tilts forward. The illumination direction of the lamp unit 10 also changes vertically in response to the posture of the vehicle 300 which leads to a change in forward illumination distance. Then, the leveling ECU 100 derives the tilt angle of the vehicle 300 in the pitch direction or a change of the tilt angle of the vehicle 300 in the pitch direction, from the output values of the acceleration sensor 110, and sets the pitch angle of the optical axis O to be an angle corresponding to the vehicle posture. When the auto-leveling control for performing the leveling adjustment of the lamp unit 10 in real time based on the vehicle posture is executed, adjusts a reaching distance of the forward illumination light can be adjusted optimally even if the vehicle posture is changed.

The acceleration sensor 110 is, for example, a three-axis acceleration sensor having an X axis, a Y axis and a Z axis which are orthogonal to each other, as sensor axes. The acceleration sensor 110 is mounted on the vehicle 300 in a desired posture. The acceleration sensor 110 detects acceleration vectors generated in the vehicle 300. During running of the vehicle 300, a gravitational acceleration and a motion acceleration caused by movement of the vehicle 300 are generated in the vehicle 300. Therefore, the acceleration sensor 110 can detect a composite acceleration vector β obtained by combining (adding) a gravitational acceleration vector G and a motion acceleration vector α, as shown in FIG. 3. Also, the acceleration sensor 110 can detect the gravitational acceleration vector G when the vehicle 300 is static.

Thus, the tilt of the vehicle 300 with respect to the gravitational acceleration vector G can be derived from the output values of the acceleration sensor 110. That is, a total angle θ corresponding to a tilt angle of the vehicle 300 with respect to the horizontal plane and including (i) the road surface angle θr which is an inclination angle of a road surface with respect to the horizontal plane and (ii) the vehicle posture angle θv which is a tilt angle of the vehicle 300 with respect to the road surface can be derived from an acceleration detected by the acceleration sensor 110. The road surface angle θr, the vehicle posture angle θv, and the total angle θ are angles of a longitudinal axis of the vehicle 300 in the vertical direction. In other words, The road surface angle θr, the vehicle posture angle θv, and the total angle θ are angles in the pitch direction of the vehicle 300.

Also, the acceleration sensor 110 outputs numerical values of respective components of the detected acceleration vector in the X axis, the Y axis and the Z axis. As described above, the acceleration sensor 110 is mounted on the vehicle 300 in the desired posture. Therefore, the three axes of the acceleration sensor 110 do not always coincide with the vehicle axes, that is, the longitudinal axis, the lateral axis and the vertical axis of the vehicle 300. Thus, the controller 104 converts the numerical values of the X-axis component, Y-axis component, and Z-axis component, which are output from the acceleration sensor 110, into components in the longitudinal axis, the lateral axis and the vertical axis of the vehicle 300. In order to convert the three-axis components of the acceleration sensor 110 into the three-axis components of the vehicle 300, information indicating a positional relationship between the sensor axes and the vehicle axes in a state where the acceleration sensor 110 is mounted on the vehicle 300 is used.

Figure 4A:
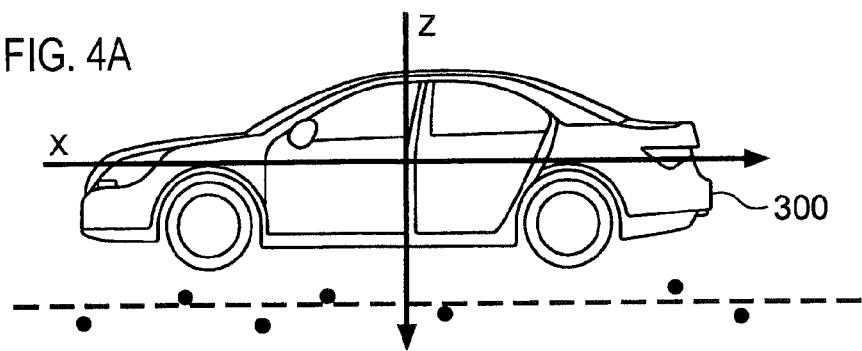
FIGS. 4A and FIG. 4B show a straight line that is obtained by plotting output values, of the acceleration sensor, which are detected during running of the vehicle is running in a state where sensor axes and vehicle axes have an ideal positional relationship.
Figure 4B:
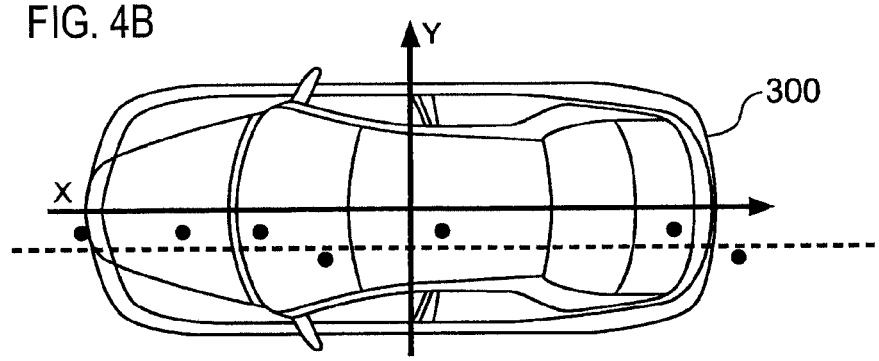
Figure 5A:
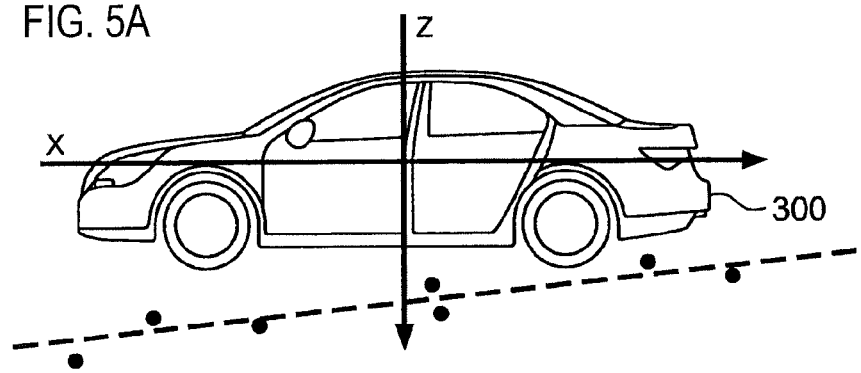
FIG. 5A and FIG. 5B showing a straight line that is obtained by plotting output values, of the acceleration sensor, which are detected during running of the vehicle in a state where the sensor axes and the vehicle axes are displaced from the ideal positional relationship.
Figure 5B:
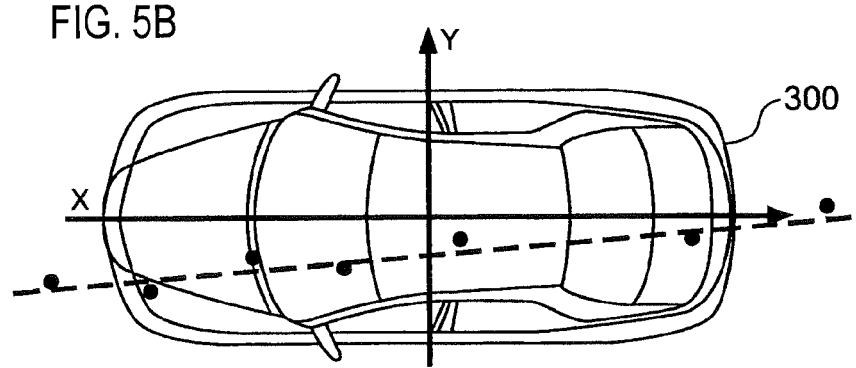

Such information is generated, for example, in the following manner in the auto-leveling control according to this embodiment. FIGS. 4A and 4B show a straight line that is obtained by plotting output values of the acceleration sensor 110 which are detected during running of the vehicle 300 in a state where the sensor axes and the vehicle axes have an ideal positional relationship. FIGS. 5A and 5B show a straight line that is obtained by plotting output values of the acceleration sensor 110 which are detected during running of the vehicle 300 in a state where the sensor axes and the vehicle axes are displaced from the ideal positional relationship. FIGS. 4A and 5A show the output values which are plotted on coordinates in which the vehicle longitudinal axis is set to a first axis (X) and the vehicle vertical axis is set to a second axis (Z). FIGS. 4B and 5B show the output values which are plotted on coordinates in which the vehicle longitudinal axis is set to a first axis (X) and the vehicle lateral axis is set to a second axis (Y).

For example, at first, during manufacturing and shipping of the leveling ECU 100, positional relationship information indicating the ideal positional relationship between the sensor axes and the vehicle axes in the state where the acceleration sensor 110 is mounted on the vehicle 300 is recorded in the memory 108. The recorded positional relationship information is derived, for example, from design values of a posture with which the acceleration sensor 110 is mounted on the vehicle 300. The design values of the posture can be, for example, obtained from a vehicle design drawing or the like. Also, the positional relationship information is, for example, a conversion table in which X, Y, and Z-axis component values of output values of the acceleration sensor 110 are associated with X, Y, Z-axis component values of the vehicle 300.

Also, in a situation where the vehicle 300 is actually used, the correction section 1041 plots output values of the acceleration sensor 110 which are obtained during running of the vehicle 300 on the coordinates in which an acceleration in the vehicle longitudinal direction is set to the first axis and an acceleration in the vehicle lateral direction or the vehicle vertical direction is set to the second axis. Then, the correction section 1041 derives a straight line (linear approximate expression) or a vector from a plurality of plotted points, for example, by use of the least-squares method, the moving average method, or the like. The output values of the acceleration sensor 110, which are plotted on the coordinates, are, for example, output values stored in the memory 108. Also, the vehicle longitudinal direction, the vehicle lateral direction and the vehicle vertical directions are based on the positional relationship information stored in the memory 108.

The vehicle 300 moves in parallel to the road surface. Accordingly, the motion acceleration vector α is a vector which is parallel to the road surface in a plane including the vehicle longitudinal axis and the vehicle vertical axis, irrespective of the vehicle posture angle θv. Also, when the vehicle posture angle θv of the vehicle 300 is equal to 0°, the vehicle longitudinal axis is theoretically parallel to the road surface. Therefore, in this case, the motion acceleration vector α is a vector which is parallel to the longitudinal axis of the vehicle 300. Accordingly, a locus of a leading end of the composite acceleration vector β which is detected by the acceleration sensor 110 when a magnitude of the motion acceleration vector α changes due to acceleration or deceleration of the vehicle 300 is a straight line which is parallel to the vehicle longitudinal axis.

Also, when the vehicle 300 is in a straight running state and is running on a horizontal road, a locus of the leading end of the composite acceleration vector β is theoretically a straight line which is in parallel to the vehicle longitudinal axis in a plane including the vehicle longitudinal axis and the vehicle lateral axis.

Therefore, in a case where the vehicle 300 has 0 degree in vehicle posture angle θv, is in the straight running state and is running on a horizontal road, if the sensor axes and the vehicle axes have an ideal positional relationship therebetween, a straight line which is substantially parallel to the vehicle longitudinal axis (a straight line shown by a broken line in FIG. 4A; hereinafter, a straight line on the XZ plane may be referred to as a "XZ straight line") can be derived as shown in FIG. 4A by plotting the output values of the acceleration sensor 110, which are obtained during running of the vehicle, on the coordinates in which the vehicle longitudinal axis (acceleration in the vehicle longitudinal direction) is set to the first axis (X) and the vehicle vertical axis (acceleration in the vehicle vertical direction) is set to the second axis (Z). Similarly, a straight line which is substantially parallel to the vehicle longitudinal axis (a straight line shown by a broken line in FIG. 4B; hereinafter a straight line on the XY plane may be referred to as a "XY straight line") can be derived as shown in FIG. 4B by plotting the output values of the acceleration sensor 110 on the coordinates in which the vehicle longitudinal axis is set to the first axis (X) and the vehicle lateral axis (acceleration in the vehicle lateral direction) is set to the second axis (Y).

However, the acceleration sensor 110 is not always mounted on the vehicle 300 accurately as designed. Therefore, actual sensor axes and the vehicle axes may be displaced from the ideal positional relationship. In the case where the X, Y, and Z axes of the acceleration sensor 110 and the longitudinal, lateral and vertical axes of the vehicle 300 are displaced from the ideal positional relationship, an XZ straight line which is inclined with respect to the vehicle longitudinal axis is obtained as shown in FIG. 5A by plotting the output values of the acceleration sensor 110 on the coordinates in which the vehicle longitudinal axis is set to the first axis (X) and the vehicle vertical axis is set to the second axis (Z). Similarly, an XY straight line which is inclined with respect to the vehicle longitudinal axis is obtained as shown in FIG. 5B by plotting the output values of the acceleration sensor 110 on the coordinates in which the vehicle longitudinal axis is set to the first axis (X) and the vehicle lateral axis is set to the second axis (Y).

The inclinations of the XZ straight line and XY straight line (angles between (i) the straight lines XZ and XY and (ii) the vehicle longitudinal axis) are information indicating that the positional relationship between the actual sensor axes and the vehicle axes are displaced from the ideal positional relationship therebetween. Also, the inclinations of the XZ straight lines and XY straight lines correspond to differences between the vehicle longitudinal axis in the positional relationship information and the vehicle longitudinal axis obtained by calculation during running of the vehicle 300. The inclinations of the XZ straight lines and XY straight line, that is, the displacements of the actual sensor axes and actual vehicle axes from the ideal positional relationship between the sensor axis and the vehicle axes lead to an error in pitch angle of the vehicle 300 which is calculated from the output values of the acceleration sensor 110.

The correction section 1041 obtains the XZ straight line and the XY straight line by plotting the output values of the acceleration sensor 110 on the above-described coordinates. Then, the correction section 1041 calculates displacements of the sensor axes and vehicle axes from the ideal positional relationship based on inclinations of the XZ straight line and XY straight line, and corrects the positional relationship information. Meanwhile, an acceleration vector may be calculated based on the output values of the acceleration sensor 110.

In this exemplary embodiment, the correction section 1041 corrects the positional relationship between the X axis of the acceleration sensor 110 and the longitudinal axis of the vehicle 300 based on the inclinations of the XZ straight line and XY straight line (or vectors). Specifically, the correction section 1041 corrects the positional relationship information so as to make the XZ straight line and the XY straight line closer to a state where the XZ straight line and XY straight line are parallel to the vehicle longitudinal axis (first axis), that is, to make the inclinations of the XZ straight line and XY straight line closer to zero. Also, if the inclination of the XZ straight line exceeds a predetermined threshold value $\theta_{thA}$, the correction section 1041 corrects the positional relationship information so as to reduce the inclination of the XZ straight line by a correction value $\theta_{cA}$ which is smaller than the threshold value $\theta_{thA}$. If the inclination of the XY straight line exceeds a predetermined threshold value $\theta_{thB}$, the correction section 1041 corrects the positional relationship information so as to reduce the inclination of the XY straight line by a correction value $\theta_{cB}$ which is smaller than the threshold value $\theta_{thB}$. As a result, even if an accuracy of a correspondence relationship between (i) the inclinations of the XZ straight line and XY straight line and (ii) the sensor axis or the vehicle axis is low, the positional relationship between the sensor axes and the vehicle axes which is defined by the positional relationship information and an actual positional relationship can be made gradually closer to each other. The "predetermined threshold value $\theta_{thA}$," the "predetermined threshold value $\theta_{thB}$," the "correction value $\theta_{thA}$," and the "correction value $\theta_{cB}$" may be set desirably based on experiments or simulations performed by a designer.

The threshold value $\theta_{thA}$ and threshold value $\theta_{thB}$ may be different values or the same value. In the case where the threshold value $\theta_{thA}$ and threshold value $\theta_{thB}$ are different values, adjustment made for a positional relationship, on the XZ plane, between the X axis of the acceleration sensor 100 and the longitudinal axis of the vehicle 300 may be different from that made for a positional relationship, on the XY plane, between the X axis of the acceleration sensor 100 and the longitudinal axis of the vehicle 300. In the case where the threshold value $\theta_{thA}$ and threshold value $\theta_{thB}$ are the same value, control can be simplified. Similarly, the correction value $\theta_{cA}$ and correction value $\theta_{cB}$ may be different values or the same value. The respective cases provide the same advantages as the cases, described above, for the threshold values.

The correction section 1041 derives the XZ straight line and XY straight line (or vectors), for example, continuously or at predetermined intervals and repeatedly corrects the positional relationship information. For example, every time when the number of output values of the acceleration sensor 110 stored in the memory 108 during running of the vehicle reaches a predetermined number, the correction section 1041 derives an XZ straight line and an XY straight line (vectors) and corrects the positional relationship information Then, the adjustment instruction section 1042 derives a tilt angle of the vehicle 300 from a current acceleration using the corrected positional relationship information and generates a control signal to give an instruction to adjust the optical axis of the lamp unit 10. Thereby, the displacement of the angle of the optical axis caused by the displacement of the positional relationship between the sensor axes and the vehicle axes can be avoided, so that more accurate auto-leveling adjustment can be achieved.

In this exemplary embodiment, the positional relationship information is corrected so as to make both of the XZ straight line and the XY straight line closer to the state where the XZ straight line and the XY straight line are parallel to the vehicle longitudinal axis. The invention is, however, not limited thereto. An accuracy of the auto-leveling control can be enhanced so long as at least one of the inclinations of the XZ straight line and XY straight line is corrected so as to make the at least one closer to a state where the at least one is parallel to the vehicle longitudinal axis. In a case where the positional relationship is corrected so as to make the XY straight line closer to a state in which the XY straight line is parallel to the vehicle longitudinal axis, this correction makes X components of the output values of the acceleration sensor 110 closer to true values. On the other hand, in the auto-leveling control, a tilt angle of the vehicle 300 is calculated based on X and Z components of the output values of the acceleration sensor 110. Therefore, even in the case where the positional relationship is corrected in terms of the XY straight line, the accuracy of the auto-leveling control can be enhanced.

Also, the leveling ECU 100 according to this exemplary embodiment performs the following control to more accurately correct the positional relationship information based on the inclination(s) of the straight line(s). FIG. 6 is a view for explaining output values of the acceleration sensor 110 which are obtained when the vehicle is in a specific running state. When a XY straight line is derived with the vehicle longitudinal axis and the vehicle lateral axis being used as coordinate axes, the inclination of the XY straight line is not changed even if the vehicle posture angle $\theta_v$ varies. Therefore, more accurate correction process can be executed. However, the following issue may arise in this case.

That is, when the vehicle 300 is in a straight running state and a horizontal road running state, as shown in FIG. 6, output values (output values shown by black circles) which have substantially constant values in the lateral axis (Y axis) of the vehicle 300, that is, which have substantially constant distances from the longitudinal axis (X axis) are obtained. On the other hand, when the vehicle 300 is in the specific running state including at least one of a predetermined curve running state and a predetermined ramp running state, an acceleration in a yaw direction is applied to the vehicle 300. Accordingly, when the vehicle 300 is in the specific running state, obtained are output values (output values shown by white circles) which are displaced largely in the vehicle lateral direction from the group of output values which are obtained when the vehicle 300 is in the straight running state and the horizontal road running state. The predetermined curve running state includes, for example, a state in which the vehicle 300 is running on a curve road. Also, the predetermined ramp running state includes, for example, a state in which the vehicle 300 is running on a road a surface of which is inclined in the vehicle width direction.

If such output values (output values shown by the white circles) are used for deriving a straight line in the process for correcting the positional relationship information, accuracy in correspondence relationship between the straight line and the sensor axis or the vehicle axis would deteriorate. Therefore, if output values to be used for deriving a straight line or vector include output values which are obtained when the vehicle 300 is in the specific running state, the correction section 1041 excludes the output values which are obtained when the vehicle 300 is in the specific running state and derives a straight line or vector from the remaining output values. As a result, the accuracy in correspondence relationship between (i) the straight line obtained by plotting the output values and (ii) the sensor axis or the vehicle longitudinal axis is enhanced, so that the accuracy in the auto-leveling control can be more enhanced.

For example, the correction section 1041 derives a reference value E for use in determination as to whether the vehicle 300 is in the specific running state from accelerations, in the vehicle lateral direction, of the plural output values of the acceleration sensor 110. Specifically, while the vehicle 300 is being actually used, the correction section 1041 plots output values of the acceleration sensor 110 on the coordinates in which acceleration in the vehicle longitudinal direction is set to the first axis and acceleration in the vehicle lateral direction is set to the second axis. Then, the correction section 1041 calculated the reference value E based on a group of the thus-obtained output values. The reference value E corresponds to, for example, the Y-axis intercept of a straight line obtained by a least-squares method. Alternatively, the reference value E may be an average of values, in the vehicle lateral direction, of the output values. The derived reference value E is recorded in the memory 108.

When the vehicle 300 is being actually used, the vehicle 300 most often runs straight on a horizontal road. Therefore, if a group of the certain number of output values is used, acceleration in the vehicle lateral direction which can be estimated to be detected when the vehicle 300 is running straight on a horizontal road, that is, a reference value E can be obtained. The reference value E may include displacements of the actual sensor axes and vehicle axes from the ideal positional relationship. However, even in this case, the reference value E has sufficiently high accuracy to determine as to whether output values of the acceleration sensors 110 are output values which are obtained in the specific running state. The reference value E may be derived using output values of the acceleration sensor 110 which are obtained when the vehicle 300 is running straight on a horizontal road. For example, such output values can be obtained in an initialization process performed in a manufacturing factory of a maker, a maintenance factory of a dealer or the like.

Then, when a difference between (i) acceleration, in the vehicle lateral direction, of an output value of the acceleration sensor 110 and (ii) the reference value E exceeds a predetermined threshold value, the correction section 1041 excludes this output value and derives a straight line or vector from other output values. That is, the correction section 1041 executes the process for correcting the positional relationship information using output values whose values in the vehicle lateral direction are within a predetermined range from a linear approximate expression obtained by plotting output values of the acceleration sensor 110 when the vehicle 300 is running straight on a horizontal road. The aforementioned selection of output values of the acceleration sensor 110 is started when a calculation condition of the reference value E is satisfied, for example, when the number of output values stored in the memory 108 reaches at least a predetermined number or when the running distance of the vehicle 300 exceeds a predetermined distance. The reference value E, the predetermined threshold, the predetermined number and the predetermined distance may be set desirably based on experiments or simulations performed by a designer.

Also, the correction section 1041 may exclude output values which are obtained in the specific running state from output values to be used in deriving of a straight line, in the following manner. That is, for example, if the number of output values stored in the memory 108 reaches at least the predetermined number, the correction section 1041 plots the output values on the coordinates in which acceleration in the vehicle longitudinal direction is set to the first axis and acceleration in the vehicle lateral direction is set to the second axis, and derives a straight line or vector. The correction section 1041 then calculates a variance of the plotted output values with respect to the straight line or vector. If the variance exceeds a predetermined threshold value, the obtained straight line or vector is discarded (cancelled). The correction section 1041 then derives a straight line or vector again when the number of output values reaches at least the predetermined number again. If the variance is equal to or smaller than the threshold value, the correction section 1041 executes the correction process. Such control can also exclude output values which are obtained in the specific running state from output values to be used in deriving a straight line. The predetermined threshold value may be set desirably based on experiments or simulations performed by a designer.

Also, the leveling ECU 100 may derive a straight line using output values of the acceleration sensor 110 which are obtained when it is detected that the vehicle 300 is running straight on a horizontal road, to thereby exclude the output values which are obtained in the specific running state from output values to be used in deriving a straight line. Whether the vehicle 300 is running straight may be determined based on an output value of the steering sensor 310, output values of the acceleration sensor 110 or output values of the wheel speed sensors 316. For example, it is determined that the vehicle 300 is running straight (i) when the output value of the steering sensor 310 is in a predetermined range including 0, (ii) when acceleration in a yaw direction which is obtained from the output values of the acceleration sensor 110 is in a predetermined range including 0, or (iii) when a difference between left and right wheel speeds which is obtained from the output values of the wheel speed sensors 316 is in a predetermined range including 0. Also, generally, the vehicle 300 often runs straight just after starting or just before stopping. Therefore, it may be determined that the vehicle 300 is running straight for a predetermined time just after starting and/or just before stopping. Whether the vehicle 300 is running on a horizontal road may be determined based on output value of the acceleration sensor 110. For example, when acceleration in a yaw direction which is obtained from the output value of the acceleration sensor 110 is in a predetermined range including 0, it may be determined that the vehicle 300 is running on a horizontal road.

Next, description will be given on an example of control, executed by the adjustment instruction 1042, for adjusting the optical axis of the lamp unit 10. An object of the auto-leveling control is to absorb a change in forward illumination distance of the lamp unit 10 caused by a change in tilt angle of the vehicle 300, so as to keep the forward reaching distance of radiated light optimal. Accordingly, the tilt angle of the vehicle 300 required for the auto-leveling control is a vehicle posture angle $\theta v$. Therefore, in the auto-leveling control using the acceleration sensor 110, it is preferable (i) that when a change in total angle $\theta$ derived from the detection values of the accelerator 110 is caused by a change in vehicle posture angle $\theta v$, the position of the optical axis of the lamp unit 10 is adjusted and (ii) that when the change in total angle $\theta$ derived from the detection values of the accelerator 110 is caused by a change in road surface angle $\theta r$, the position of the optical axis of the lamp unit 10 is kept.

Then, the leveling ECU 100 estimates a change in total angle $\theta$ which occurs when the vehicle is static, as a change in vehicle posture angle $\theta v$. Also, the leveling ECU 100 estimates a change in total angle $\theta$ which occurs when the vehicle is running, as a change in road surface angle $\theta r$. When the vehicle is running, the vehicle posture angle $\theta v$ rarely changes due to increase or decrease of a mounted load or increase or decrease of the number of passengers. It is, therefore, possible to estimate the change in the total angle $\theta$ which occurs when the vehicle is running, as the change in road surface angle $\theta r$. On the other hand, when the vehicle is static, the vehicle 300 rarely moves to lead to a change in road surface angle $\theta r$. It is, therefore, possible to estimate the change in total angle $\theta$ which occurs when the vehicle is static, as the change in vehicle posture angle $\theta v$.

Then, the adjustment instruction section 1042 executes adjustment of the optical axis in accordance with the change in total angle $\theta$ which occurs when the vehicle is static and avoids adjustment of the optical axis in accordance with the change in total angle $\theta$ which occurs when the vehicle is running. The adjustment instruction section 1042 can avoid adjustment of the optical axis by (i) avoiding generation or output of an optical axis adjustment signal or (ii) outputting an optical axis keeping signal that instructs keeping of a position of the optical axis.

Specifically, at first, in a manufacturing factory of a maker or the like, the vehicle 300 is placed on a horizontal plane and brought into a reference state. Then, an initialization signal is transmitted to the leveling ECU 100 by switch operation on an initialization processing device, communication through a CAN (Controller Area Network) system, or the like. Upon receipt of the initialization signal, the controller 120 starts initial aiming adjustment to set the optical axis O of the lamp unit 10 to be in an initial setting position. Also, the controller 120 stores, in the memory 108, a value of the total angle $\theta$ which is obtained based on (i) output values of the acceleration sensor 110 in the reference state and (ii) the positional relationship information, as a reference value of the road surface angle $\theta r$ ($\theta r=0°$) and a reference value of the vehicle posture angle $\theta v$ ($\theta v=0°$).

In a situation where the vehicle 300 is actually used, the adjustment instruction section 1042 avoids adjustment of the optical axis in accordance with a change in total angle $\theta$ which occurs when the vehicle 300 is running. Also, the correction section 1041 executes the aforementioned correction process on the positional relationship information using output values of the accelerator sensor 110 during running of the vehicle. In this correction process, the reference value of the road surface angle $\theta r$ and the reference value of the vehicle posture angle $\theta v$ stored in the memory 108 may be corrected. Also, the adjustment instruction section 1042 regards the change in total angle $\theta$ which occurs when the vehicle is running as the change in road surface angle $\theta r$ and updates the reference value of the road surface angle $\theta r$. For example, when the vehicle is stopping, the adjustment instruction section 1042 subtracts the reference value of the vehicle posture angle $\theta v$ from the current total angle $\theta$ to obtain a road surface angle $\theta r$. Then, the obtained road surface angle $\theta r$ is stored in the memory 108 as a new reference value. As a result, the change in total angle $\theta$ estimated as the change in road surface angle $\theta r$ is incorporated into the reference value of the road surface angle $\theta r$. When the vehicle is stopping, the adjustment instruction section 1042 may calculate a difference between the total angle $\theta$ before running and the total angle $\theta$ after the running and calculate a new reference value of the road surface angle $\theta r$ based on the calculated difference and the current reference value of the road surface angle $\theta r$.

For example, the adjustment instruction section 1042 adds the calculated difference to the current reference value of the road surface angle $\theta r$ (if the calculated difference is a negative value, an absolute value of the calculated difference is subtracted from the current reference value of the road surface angle $\theta r$). Thereby, a variation of the road surface angle $\theta r$ during running of the vehicle 300 is reflected to the current reference value of the road surface angle $\theta r$, and the new reference value of the road surface angle $\theta r$ is obtained.

When the vehicle is static, the adjustment instruction section 1042 subtracts the reference value of the road surface angle $\theta r$ from the current total angle $\theta$ to thereby derive a vehicle posture angle $\theta v$. Then, the derived vehicle posture angle $\theta v$ is stored in the memory 108 as a new reference value. Also, the optical axis is adjusted using the derived vehicle posture angle $\theta v$ or the updated reference value of the vehicle posture angle $\theta v$. As a result, the change in total angle θ which occurs when the vehicle is static is estimated as the change in vehicle posture angle θv and is incorporated into the reference value of the vehicle posture angle θv. For example, the adjustment instruction section 1042 may calculate a difference between (i) a total angle θ which is detected at a previous time and (ii) a current total angle θ and calculate a new reference value of the vehicle posture angle θv based on the calculated difference and the current reference value of the vehicle posture angle θv.

For example, the adjustment instruction section 1042 adds the calculated difference to the current reference value of the vehicle posture angle θv (if the calculated difference is a negative value, an absolute value of the calculated difference is subtracted from the current reference value of the vehicle posture angle θv). Thereby, a variation of the vehicle posture angle θv when the vehicle 300 is static is reflected to the current reference value of the vehicle posture angle θv, and the new reference value of the vehicle posture angle θv is obtained. It can be determined whether or not the vehicle is running, for example, based on a vehicle speed obtained from the vehicle speed sensor 312. It also can be determined whether or not the vehicle is in static, for example, based on a vehicle speed obtained from the vehicle speed sensor 312.

Figure 7:
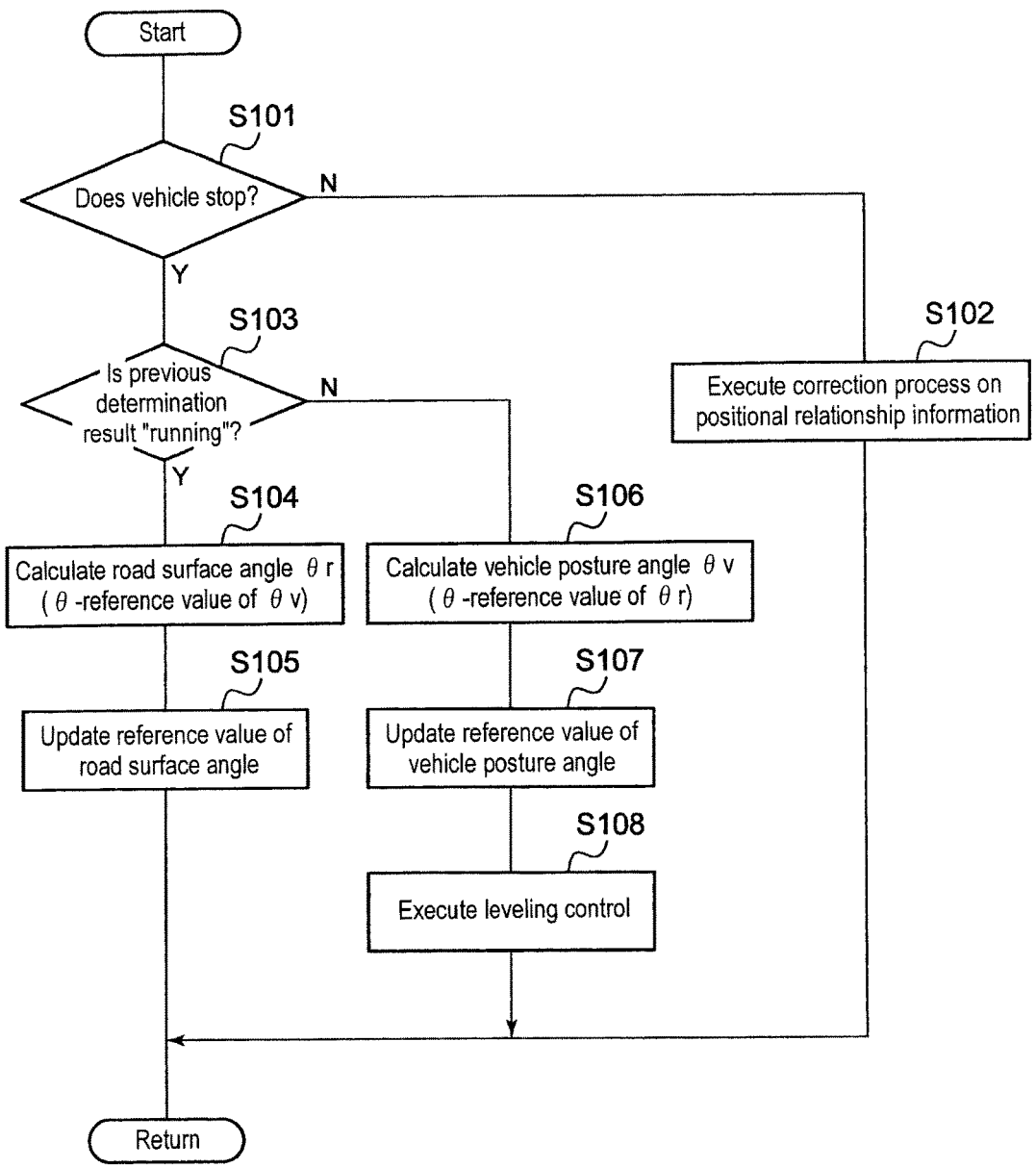
FIG. 7 is a flowchart showing an example of an auto-leveling control to be executed by the leveling ECU according to the embodiment.

FIG. 7 is a flowchart showing an example of the auto-leveling control to be executed by the leveling ECU according to the exemplary embodiment. This flowchart is executed repeatedly at predetermined timing by the controller 104 when an ignition switch is turned on, for example, in a state where an instruction to execute an auto-leveling control has been given by the light switch 304. The flowchart is terminated when the ignition switch is turned off.

At first, the controller 104 determines as to whether the vehicle 300 stops (S101). If the vehicle 300 does not stop (N in S101), that is, if the vehicle 300 is running, the controller 104 executes the correction process on the positional relationship information using output values of the acceleration sensor 110 which are obtained during running of the vehicle (S102), and the routine is terminated. If the vehicle 300 stops (Y in S101), the controller 104 determines as to whether the vehicle 300 was running (N in S101) in the previous stop determination in step 101. If the vehicle 300 was running in the previous stop determination (Y in S103), the controller 104 subtracts the reference value of the vehicle posture angle θv from the current total angle θ to calculate a road surface angle θr (S104). Then, a reference value of the road surface angle θr is updated using the obtained road surface angle θr (S105), that is, the obtained road surface angle θr is set to a new reference value of the road surface angle θr. The routine is terminated.

If the vehicle 300 was not running in the previous stop determination (N in S103), the controller 104 subtracts the reference value of the road surface angle θr from the current total angle θ to calculate a vehicle posture angle θv (S106). Then, the reference value of the vehicle posture angle θv is updated using the obtained vehicle posture angle θv (S107), that is, the obtained vehicle posture angle θv is set to a new reference value of the vehicle posture angle θv. Also, the leveling control is executed using the obtained vehicle posture angle θv or the reference value of the vehicle posture angle θv (S108), and the routine is terminated.

As described above, in the leveling ECU 100 according to the exemplary embodiment, the positional relationship information indicating the ideal positional relationship between the sensor axes and the vehicle axes in the state where the acceleration sensor 110 is mounted on the vehicle 300 is stored in the memory 108. Then, the correction section 1041 plots the output values of the acceleration sensor 110, which are obtained during running of the vehicle, on the coordinates in which acceleration in the vehicle longitudinal direction is set to the first axis and acceleration in the vehicle lateral direction or the vehicle vertical direction is set to the second axis. Thereby, the correction section 1041 derives a straight line or vector. Then, the correction section 1041 calculates displacements of the sensor axes and vehicle axes from the ideal positional relationship, using the inclination of the straight line or the inclination of the vector, and corrects the positional relationship information. The adjustment instruction section 1042 derives a tilt angle of the vehicle 300 using the corrected positional relationship information, and performs the auto-leveling control on the lamp unit 10. Thus, it is possible to enhance the accuracy of the auto-leveling control of the vehicle lamp.

Also, the correction process on the positional relationship information corrects the displacement of an actual positional relationship from the ideal positional relationship between the sensor axes and the vehicle axes. Therefore, it is not required to extremely enhance the accuracy in attachment position of the acceleration sensor 110 or the leveling ECU 100. It is, therefore, possible to avoid complication of a step of attaching the acceleration sensor 110 and the leveling ECU 100.

The invention is not limited to the aforementioned exemplary embodiment. Modifications including various changes on the design may be made on the exemplary embodiment based on knowledge that those skilled in the art have. Any embodiment to which such a modification has been applied is also included in the scope of the invention. A new embodiment produced by combination of the aforementioned exemplary embodiment and a modification has both the effect of the combined embodiment and the effect of the combined modification.

In the above exemplary embodiment, the correction section 1041 corrects the positional relationship information, and the adjustment instruction section 1042 executes adjustment of the optical axis using the corrected positional relationship information. The invention is, however, not limited thereto. That is, the correction section 1041 and the adjustment instruction section 1042 may operate in the following manner. For example, the correction section 1041 calculates a displacement of a positional relationship between actual sensor axes and vehicle axes from the ideal positional relationship, using the above described method. Then, the correction section 1041 sets the displacement to correction information. Also, the adjustment instruction section 1042 derives a tilt angle of the vehicle 300 based on the pre-corrected positional relationship and a current acceleration. Then, the adjustment instruction section 1042 corrects the obtained tilt angle of the vehicle 300 using the correction information and executes adjustment of the optical axis using the corrected tilt angle of the vehicle 300. That is, what is to be corrected by the correction section 1041 may be the positional relationship information or the tilt angle of the vehicle 300 which is derived based on the pre-corrected positional relationship information. The above described correction information is, for example, a difference(s) between (i) an angle(s) of the vehicle longitudinal axis in the positional relationship information on the XZ plane and/or XY plane and (ii) an angle(s) of an inclination(s) of an XZ straight line and/or an XY straight line which are obtained by calculation during running of the vehicle.

What is claimed is:

1. A vehicle lamp control apparatus comprising:
   a receiver configured to receive output values of an acceleration sensor;
   a position information storage configured to store information indicating an ideal positional relationship between (i) sensor-side axes in a state where the acceleration sensor is mounted on a vehicle and (ii) vehicle-side axes defining a posture of the vehicle;
   a correction section configured to
      plot the output values, which are obtained during running of the vehicle, on coordinates in which acceleration in a vehicle longitudinal direction is set to a first axis and acceleration in a vehicle lateral direction or a vehicle vertical direction is set to a second axis,
      derive a straight line or a vector from plural plotted points on the coordinates,
      calculate displacements of the sensor-side axes and the vehicle-side axes from the ideal positional relationship, using an inclination of the straight line or the vector, and
      correct the information; and
   an adjustment instruction section configured to
      derive a tilt angle of the vehicle from current acceleration using the corrected information, and
      generate a control signal to instruct adjustment of an optical axis of a vehicle lamp.

2. The vehicle lamp control apparatus according to claim 1, wherein
   the sensor-side axes include an X axis, a Y axis and a Z axis which are mutually orthogonal to each other; and
   the correction section is configured to correct a positional relationship between the X axis and the vehicle longitudinal axis based on the inclination.

3. The vehicle lamp control apparatus according to claim 1, wherein the correction section is configured, if the inclination exceeds a predetermined threshold value, to correct the information so as to decrease the inclination by a correction value which is smaller than the predetermined threshold value.

4. The vehicle lamp control apparatus according to claim 1, wherein if output values which are obtained when the vehicle is in a specific running state including at least one of a predetermined curve running state and a predetermined ramp running state are included in the output values to be used for deriving the straight line or the vector, the correction section excludes the obtained output values and then derives the straight line or the vector.

5. The vehicle lamp control apparatus according to claim 4, wherein
   the correction section is configured to derive a reference value for determining the specific running state from accelerations, in the vehicle lateral direction, of the plural output values, and
   if a difference between the acceleration, in the vehicle lateral direction, of each output value of the acceleration sensor and the reference value exceeds a predetermined threshold value, the correction section excludes the output value and derives the straight line or the vector.

6. The vehicle lamp control apparatus according to claim 1, wherein
   the correction section is configured to
      plot the output values, which are obtained during running of the vehicle, on the coordinates in which the acceleration in the vehicle longitudinal direction is set to the first axis and the acceleration in the vehicle lateral direction is set to the second axis,
      derive the straight line or the vector from the plural plotted points,
      calculate a variance of the plotted output values with respect to the derived straight line or the vector, and
      derive a straight line or a vector again when the obtained variance exceeds a predetermined threshold value.

7. A vehicle lamp control apparatus comprising:
   a receiver configured to receive output values of an acceleration sensor;
   a position information storage configured to store information indicating an ideal positional relationship between (i) sensor-side axes in a state where the acceleration sensor is mounted on a vehicle and (ii) vehicle-side axes defining a posture of the vehicle;
   a correction section configured to
      plot the output values, which are obtained during running of the vehicle, on coordinates in which acceleration in a vehicle longitudinal direction is set to a first axis and acceleration in a vehicle lateral direction or a vehicle vertical direction is set to a second axis,
      derive a straight line or a vector from plural plotted points on the coordinates,
      calculate, as correction information, displacements of the sensor-side axes and the vehicle-side axes from the ideal positional relationship, using an inclination of the straight line or the vector; and
   an adjustment instruction section configured to
      derive a tilt angle of the vehicle from current acceleration using the information,
      correct the derived tilt angle using the corrected information, and
      generate a control signal to instruct adjustment of an optical axis of a vehicle lamp, using the corrected tilt angle.

* * * * *